UNITED STATES PATENT OFFICE.

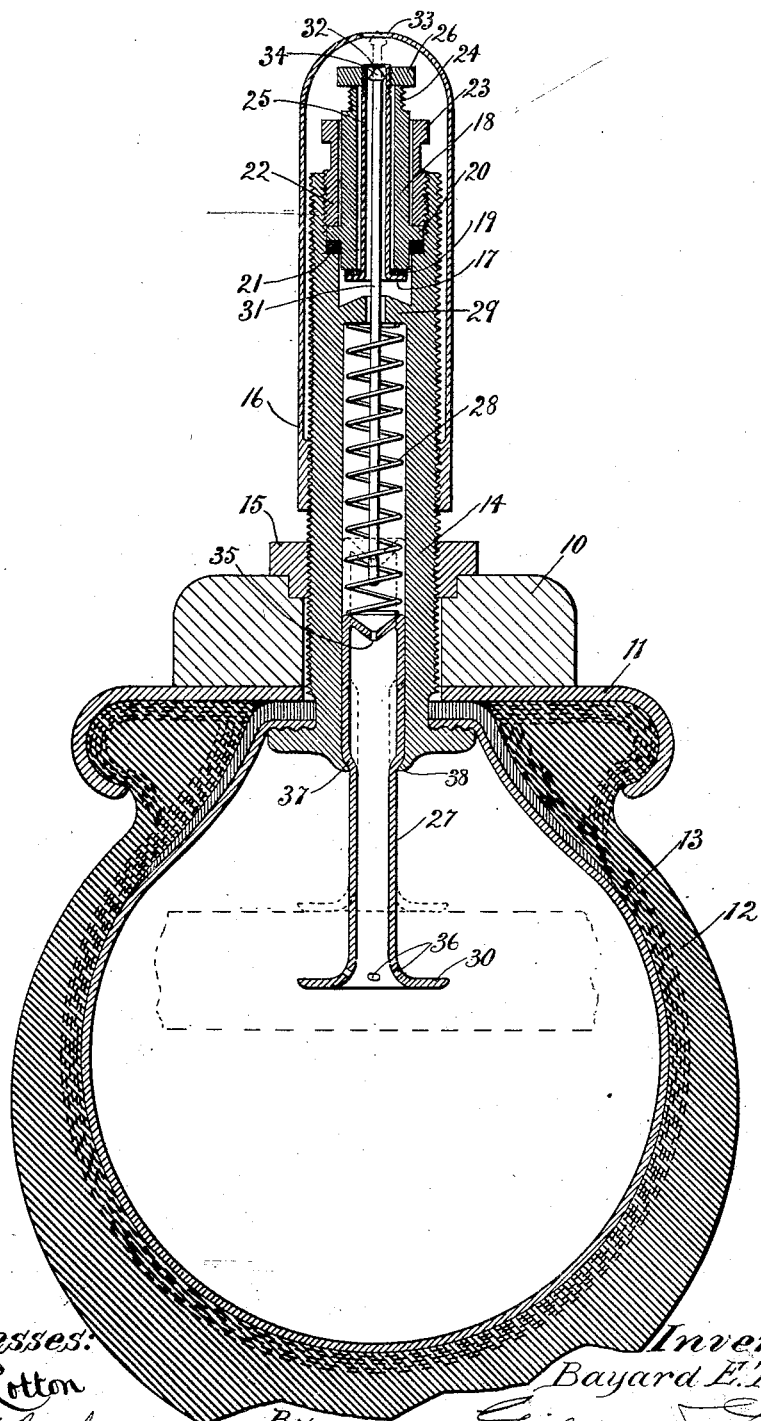

BAYARD E. TAYLOR, OF OAK PARK, ILLINOIS.

VALVE FOR PNEUMATIC TIRES.

1,157,822.  Specification of Letters Patent.  Patented Oct. 26, 1915.

Application filed January 27, 1915. Serial No. 4,718.

*To all whom it may concern:*

Be it known that I, BAYARD E. TAYLOR, a citizen of the United States, and resident of Oak Park, county of Cook, and State of Illinois, have invented certain new and useful Improvements in Valves for Pneumatic Tires, of which the following is a specification, and which are illustrated in the accompanying drawings, forming a part thereof.

The invention relates to valves for pneumatic tires such as are commonly used on automobiles; its objects being to provide for securely retaining the compressed air within the tire and for sounding an alarm in the event of the collapse of the tire partially or completely.

As to certain features the improved device comes within the scope of the invention forming the subject of my copending application filed March 11th, 1912, Serial No. 682,851.

The invention consists of the features hereinafter pointed out, and is illustrated in the accompanying drawings which represent a transverse sectional view of the vehicle wheel rim and tire and a central longitudinal sectional view through the valve mechanism.

The vehicle wheel rim is represented at 10, and its tire retaining flange at 11.

The tire casing is shown at 12 and its inner tube at 13. A valve casing 14 is secured to the tube 13 in the usual manner, and is externally threaded to accommodate a locking nut 15 and the usual cap 16.

The valve 17 is in the form of a central apertured disk adapted to seat against the inner end of a sleeve 18, a suitable gasket 19 being interposed between the valve and the seat. The sleeve 18 is housed within a counterbore in the outer end of the casing 14, and is provided with an annular flange 20 near its inner end, a ring gasket 21 being interposed between this flange and the bottom of the counterbore of the casing. The sleeve is held in place by means of a bushing 22 in threaded engagement with the inner wall of the counterbore of the casing 14, and having a projecting end 23 to which a suitable turning tool may be applied. The outer portion of the sleeve 18 is externally threaded, as shown at 24, for the application thereto of a pump nipple.

The valve 17 is provided with a tubular stem 25 which projects loosely through the sleeve 18 and extends beyond its outer end. The outer end of this sleeve may be threaded to receive a nut 26 which, reacting against the outer end of the sleeve, will draw the valve firmly to its seat. A holllow plunger 27 reciprocates within and extends beyond the inner end of the casing 14, and is advanced into the tube 13 by means of a helical spring 28 reacting between its inner end and a bridge 29 crossing the chamber of the casing. The inner end of the plunger 27 is flattened or flanged, as shown at 30.

In the event of the collapse of the tire, the plunger 27 will be forced inwardly, as indicated by dotted lines. A thrust rod 31 is located within the hollow stem 25 of the valve and projects to within a short distance of the end of the plunger 27. The outer end 32 of the valve stem 25 is of frangible material, its strength, however, being sufficient to withstand the maximum pressure that is developed within the tire. The outer end of the rod 31 is preferably pointed. Upon the collapse of the tire the weight of the vehicle moves the plunger 27 inwardly with relation to the casing 14, thereby forcing the rod 31 through the end 32 of the valve stem, permitting the air to escape with sufficient freedom to cause a loud whistling sound. Preferably the end of the cap 16 is apertured, as shown at 33, and the margins of this aperture will act as the lips of a whistle upon which the jet of air issuing from the ruptured end of the valve stem will impinge. The outer end of the rod 31 may be headed, as shown at 34, and given a somewhat lance-shaped point in order to facilitate the rupturing of the end of the stem. This head 34 may be sufficiently large to frictionally engage the walls of the valve stem and thus hold the rod in position.

The end of the plunger 27 which makes contact with the rod 31 is centrally apertured, as shown at 35, to permit the air to freely enter the tire during the inflating operation, and this aperture also serves the purpose of directing a jet of air against the inner end of the rod 31 when the end of the valve stem is ruptured, insuring the outward movement of the rod a sufficient distance to carry its head beyond the opened end of the stem so that it will not act as an obstruction to the outflowing air.

The plunger 27 is laterally perforated adjacent its inner end, as shown at 36, to permit the free escape of air should the end of the plunger be closed by engagement therewith of the wall of the tire tube. In order to retain the plunger within the casing 14, it is preferably formed with an annular shoulder 37, and after being inserted within the casing the metal of the latter surrounding the inner end of its aperture is upset, as by the blow of a hammer, to form one or more lips 38 for engaging this shoulder.

I claim as my invention—

1. A valve for pneumatic tires comprising, in combination, a chambered casing, an outwardly seating valve within the casing and having a hollow stem closed at its outer end, a thrust rod having one end within the valve stem and the other end projecting into the chamber of the casing, and a plunger reciprocable within the casing and engageable with the thrust rod, one end of the plunger projecting beyond the inner end of the casing.

2. A valve for pneumatic tires comprising, in combination, a chambered casing, an outwardly seating valve within the casing and having a hollow stem, the end of the stem being frangible, and means adapted to be actuated by the collapse of the tire to which the valve is applied for rupturing the valve stem end.

3. A valve for pneumatic tires comprising, in combination, a chambered casing, an outwardly seating valve within the casing and having a hollow stem, the end of the stem being frangible, means adapted to be actuated by the collapse of the tire to which the valve is applied for rupturing the valve stem end, and a cap covering the outer end of the valve stem and having an orifice in line therewith.

4. A valve for pneumatic tires comprising, in combination, a chambered casing, an annular valve seat secured within the outer end of the casing, a valve engageable with the seat and having a hollow stem projecting therethrough and having its outer end closed, a thrust rod located within the valve stem and projecting through and beyond the valve, a plunger reciprocable with the casing and extending beyond the inner end thereof and being engageable with the rod, the end of the plunger having an aperture in line with the rod, the aperture being of less diameter than the rod.

BAYARD E. TAYLOR.

Witnesses:
LOUIS K. GILLSON,
E. M. KLATCHER.